Sept. 16, 1969     R. H. RAKESTRAW     3,466,856

TOBACCO PRIMING APPARATUS

Filed Aug. 2, 1967

INVENTOR

ROBERT H. RAKESTRAW

BY

ATTORNEY

United States Patent Office 3,466,856
Patented Sept. 16, 1969

3,466,856
TOBACCO PRIMING APPARATUS
Robert H. Rakestraw, P.O. Box 13,
Stoneville, N.C. 27048
Filed Aug. 2, 1967, Ser. No. 657,904
Int. Cl. A01d 45/16
U.S. Cl. 56—27.5       6 Claims

ABSTRACT OF THE DISCLOSURE

A divided carrier for a multiplicity of coacting pairs of cutters is caused to traverse rows of tobacco plants by suitable transporting means. The cutters are carried on driven endless flexible elements which are arranged at an acute angle of inclination to the horizontal. The cutters have a horizontal increment of movement equal to the forward rate of movement of the carrier but in a reverse direction so that the net resultant movement of the cutters relative to any given plant stalk is vertically upwardly. Each coacting pair of cutters substantially surrounds or embraces the main plant stalk so that its upward movement will sever the stems of the tobacco leaves.

Background of the invention

The invention pertains to that class of device which removes whole tobacco leaves cleanly from the main standing stalks of row arranged tobacco plants. A number of such devices have been proposed by the prior art but none have proven completely practical and successful. Some examples of the prior art are United States Patents 2,834,173 and 2,834,174 to Wilson and Patent 2,635,408 to Cox. In general, the prior art structures have not been reliable in removing the leaves cleanly from the main stalks and in sufficient numbers so that a single pass of the machine along a row will effectively prime the tobacco plants. The present invention accomplishes these and other objectives which will become apparent as the description proceeds.

Summary of the invention

A divided frame or support is mounted on a self-propelled vehicle which is capable of traversing rows of tobacco with motor and driver above the rows. The priming unit will have preferably hydraulically operated means to raise and lower the cutter or knife structure. Such vehicles are available on the market.

Mounted on the frame sections are inclined drive shafts and gearing which operate opposed inclined endless chains or like elements. The chains each carry a multiplicity of vertical approximately semi-circular cutters or knives which form coacting pairs to embrace and enclose the tobacco plant main stalks during traversing of the rows. The chains are driven reversely of the direction of movement of the support or frame and at such a rate that the cutters have zero or nearly zero horizontal movement relative to any main stalk but move upwardly vertically relative thereto to sever the stems of tobacco leaves, the upper edges of the semi-circular cutters being sharp knife edges.

Description of the preferred embodiment

Figure 1:
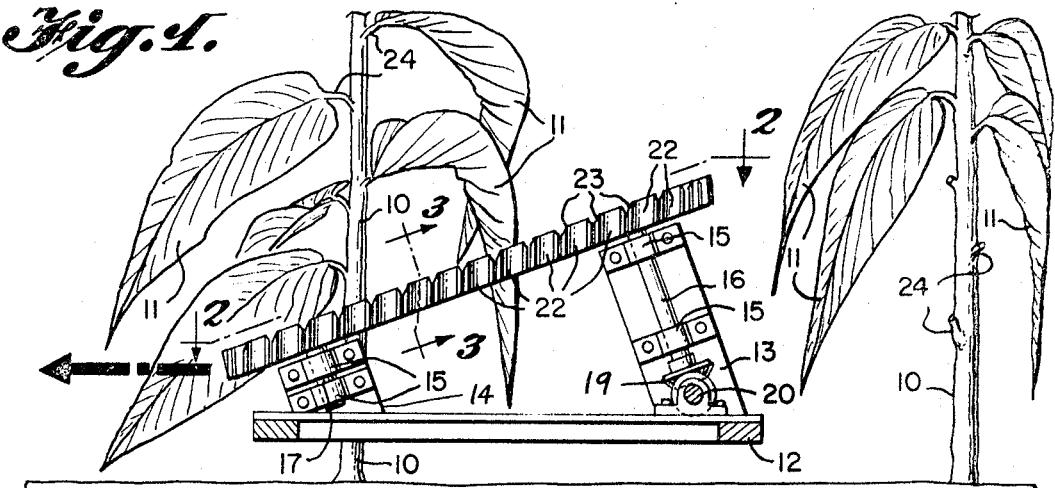
FIGURE 1 is a side elevational view of the apparatus, partly in section.

Referring to the drawings where like numerals designate like parts, the invention apparatus is moved along rows of standing tobacco plants 10 on a self-propelled vehicle having means to adjust the cutting apparatus vertically, as previously mentioned. The construction and size of the apparatus is such that it will act on one tobacco plant at a time and remove an average of three or four leaves from the main plant stalk on each pass of the apparatus in the direction of the arrow in FIGURE 1. Primings are made weekly as the tobacco ripens until all leaves are removed. The usual harvest season is six to eight weeks long. FIGURE 1 depicts generally the size and shape of the apparatus relative to the plants in a row.

As shown, the apparatus comprises a frame or support 12 which is divided longitudinally to receive a row of plants between its half sections.

Rising from the frame 12 and rigid therewith are forwardly inclined support members 13 and 14 carrying suitable bearings 15 for rotary shafts 16 and 17, the tops of which carry sprocket gears 18, as shown. All of the sprocket gears 18 lie in a common inclined plane, preferably about thirty degrees to the horizontal and sloping downwardly in the forward direction or in the direction of movement of the apparatus along a row, as shown by the arrow in FIGURE 1.

The lower ends of the rear pair of shafts 16 are positively driven by pairs of bevel gears 19 which in turn are driven through lateral shafts 20 connected with any convenient source of power on the tractor.

Figure 4:
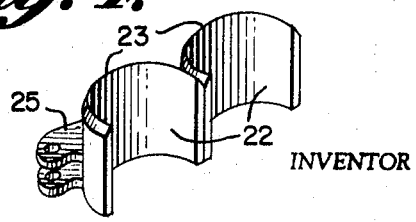
FIGURE 4 is a fragmentary perspective view of cutter elements.

The laterally opposed and spaced pairs of sprocket gears 18 carry inclined endless sprocket chains 21, each such chain carrying on its outer side a multiplicity of equidistantly spaced semi-cylindrical cutters or knives 22 whose top edges 23 are sharp so as to be capable of severing the stems 24 of tobacco leaves 11 close to the main stalks of the plants. The cutters 22 carry lugs 25, FIGURE 4, for connecting the individual cutters with the endless chains 21, as shown.

Figure 2:
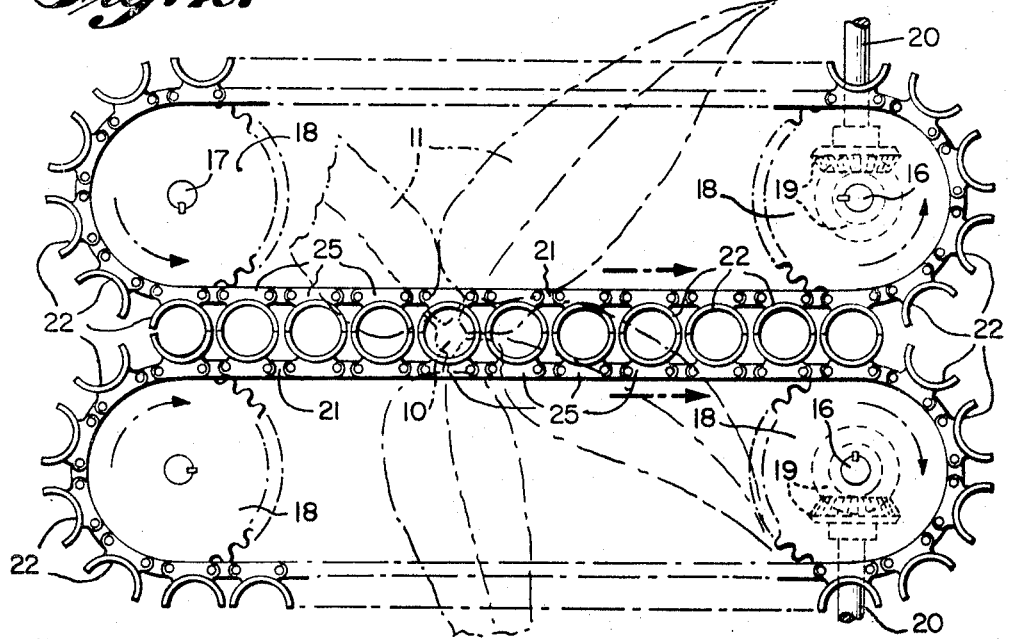
FIGURE 2 is an enlarged plan view of the invention taken on line 2—2 of FIGURE 1.
Figure 3:
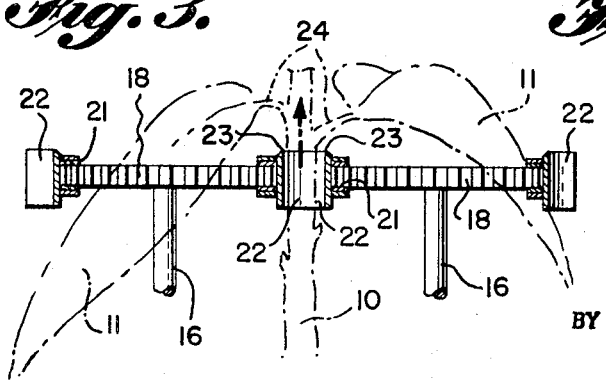
FIGURE 3 is an enlarged transverse section taken on line 3—3 of FIGURE 1.

Referring to FIGURES 2 and 3 primarily, the chains 21 are driven simultaneously in the same direction and rearwardly of the direction of travel of the frame 12 along the row. The rate of movement of the chains 21 is such that the cutters 22 have substantially zero horizontal movement relative to the plants 10 at any moment and have upward vertical movement relative to the plants as the frame traverses the rows. The cutters 22 form coacting pairs at the inner sides of the chains 21 and each pair of cutters may surround the main stalk of the standing plant 10 with the sharpened knife edges 23 facing upwardly, as in FIGURES 1 and 3. As shown, the cutters 22 have their axes disposed vertically even though chains 21 are inclined. This enables the coacting pairs of cutters to closely surround each plant stalk and shear the leaf stems cleanly upwardly.

It may be seen that as the apparatus travels toward the left in FIGURE 1 along the row of plants 10, the inner sides of the chains 21 move in a reverse direction at an equal speed so that the resultant movement of the closed pairs of vertical axis cutters 22 relative to a plant stalk is upward. This upward movement, FIGURE 3, enables the cutting edges 23 to shear off the leaf stems 24 cleanly close to the main stalk of the plant. In this manner, the apparatus will remove three or four tobacco leaves from each plant in a row in the region of the plant which is spanned or traversed by the inclined chain structure. As stated, the entire cutting apparatus may be adjusted vertically by conventional means, not shown, to remove leaves from different elevations of the plants as the leaves ripen gradually during the harvesting season.

As the machine moves forwardly, the coacting pairs of cutters 22 will separate continuously as at the right hand end of FIGURE 2, as additional cutters move together to engage about plant stalks as at the left hand end of FIGURE 2. The cutting action is continuous and smooth in operation and leaves are removed effectively around the entire circumference of the plant, thus overcoming one of the main deficiencies of the prior art. In the prior art, it has been practical and possible to remove leaves from a portion only of the complete circumference of the plant and too many leaves remained unharvested and must be picked by hand.

The advantages of the invention should now be apparent to those skilled in the art without the necessity for any further description.

It is to be understood that the form of the invention herewith shown and described is to be taken as a preferred example of the same, and that various changes in the shape, size and arrangement of parts may be resorted to, without departing from the spirit of the invention or scope of the subjoining claims.

I claim:

1. Apparatus for priming tobacco plants having main standing stalks and tobacco leaves radiating from the main stalks randomly around the circumferences of the stalks, said apparatus comprising a support movable along a row of tobacco plants, a pair of laterally spaced endless flexible elements on said support and disposed on opposite sides of the plants in the row and being inclined longitudinally of the row, means to drive the endless flexible elements in unison, and a plurality of tobacco leaf cutters carried by each flexible element, pairs of said cutters moving together in opposed relationship at the inner sides of the flexible elements and said pairs then adapted to surround and substantially enclose the main stalks of the tobacco plants in said row, the cutters each having an end cutting edge.

2. Apparatus for priming tobacco plants in accordance with claim 1, and wherein the cutters carried by each flexible element are approximately semi-cylindrical and the top edges of the cutters constitute the cutting edges, said endless flexible elements being inclined downwardly and forwardly with respect to the direction of movement of the apparatus along rows.

3. Apparatus for priming tobacco plants in accordance with claim 1, and wherein said means drives said flexible elements reversely of the direction of movement of the support along said row and at a speed whereby said cutters have substantially zero velocity horizontally relative to the plants in the row and have vertical movement relative to the plants as the apparatus moves along the row.

4. Apparatus for priming tobacco plants in accordance with claim 2, and wherein the flexible elements are sprocket chains, and sprocket gearing on the support engaging and supporting said chains and driving the interior runs of the chains in unison and reversely of the direction of movement of the support along the row.

5. Apparatus for priming tobacco plants in rows comprising supporting means adapted to be transported along rows of plants, a pair of laterally opposed inclined endless flexible carrier members on the support, power means connected with the carrier members to drive them in unison, and a plurality of opposing pairs of substantially semi-circular cutter elements secured to the flexible carrier members in uniformly spaced relation, each pair capable of moving into surrounding relationship with the main stalk of a tobacco plant and moving vertically relative to the main stalk to sever the stems of tobacco leaves radiating from the main stalk at any point around the circumference of the main stalk.

6. Apparatus for priming tobacco plants in rows in accordance with claim 5, and wherein the top edges of the semi-circular cutter elements are knife edges and the top edges move upwardly vertically relative to the main stalks of tobacco plants while the apparatus traverses a row of such plants, the endless flexible carrier members being inclined downwardly and forwardly relative to the direction of movement of the supporting means and being driven by the power means rearwardly of the direction of movement of the supporting means and at such a speed that the cutter elements have susbtantially zero velocity horizontally relative to the main stalks of the plants.

References Cited

UNITED STATES PATENTS

| | | | |
|---|---|---|---|
| 2,635,408 | 4/1953 | Cox | 56—27.5 |
| 2,834,173 | 5/1958 | Wilson | 56—27.5 |
| 3,093,949 | 6/1963 | Splinter | 56—27.5 |
| 3,393,501 | 7/1968 | Meyer | 56—327 |

RUSSELL R. KINSEY, Primary Examiner